United States Patent
Williams, Jr. et al.

(10) Patent No.: US 10,367,751 B2
(45) Date of Patent: Jul. 30, 2019

(54) DISTRIBUTING AND RATE LIMITING PACKETS AMONG MULTIPLE PATHS IN A SINGLE STAGE SWITCHING TOPOLOGY TO A REORDERING NODE

(71) Applicant: Cisco Technology, Inc., San Jose, CA (US)

(72) Inventors: John J. Williams, Jr., Pleasanton, CA (US); Dipankar Bhatt Acharya, Saratoga, CA (US); Mohammed Ismael Tatar, Kanata (CA); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/439,144

(22) Filed: Feb. 22, 2017

(65) Prior Publication Data

US 2018/0241688 A1 Aug. 23, 2018

(51) Int. Cl.
*H04L 12/869* (2013.01)
*H04L 12/851* (2013.01)
*H04L 1/18* (2006.01)

(52) U.S. Cl.
CPC .............. *H04L 47/58* (2013.01); *H04L 47/24* (2013.01); *H04L 1/1835* (2013.01)

(58) Field of Classification Search
CPC ............... H04L 2012/565; H04L 47/50; H04L 49/1515; H04L 49/1553; H04L 49/3018; H04L 49/3027; H04L 49/552
See application file for complete search history.

(56) References Cited

U.S. PATENT DOCUMENTS

| 6,907,041 | B1 * | 6/2005 | Turner ................ H04L 12/5601 370/388 |
| 7,269,139 | B1 | 9/2007 | Williams, Jr. et al. | |

OTHER PUBLICATIONS

"Priority Flow Control: Build Reliable Layer 2 Infrastructure," Sep. 2015, Cisco Systems, Inc., San Jose, CA, USA (eight pages).
"Media Access Control (MAC) Bridges and Virtual Bridged Local Area Networks—Amendment 17: Priority-based Flow Control," IEEE Standard for Local and Metropolitan Area Networks, Sep. 30, 2011, IEEE Computer Society, IEEE, New York, NY (forty pages).
Victor Lama, "An Introduction to Priority-based Flow Control," Feb. 28, 2011, Cisco Systems, Inc., San Jose, CA (four pages).

* cited by examiner

*Primary Examiner* — Yemane Mesfin
*Assistant Examiner* — Mon Cheri S Davenport
(74) *Attorney, Agent, or Firm* — The Law Office of Kirk D. Williams

(57) ABSTRACT

One embodiment includes multiple distribution nodes sending packets of different ordered sets of packets among multiple packet switching devices arranged in a single stage topology to reach a reordering node. The reordering node receives these packets sent over the different paths and stores them in reordering storage, such as, but not limited to, in queues for each distribution node and packet switching device combination. The reordering node sends packets stored in the reordering storage from the reordering node in original orderings. In response to determining that an aggregation quantum of packets received from the multiple distribution nodes via a particular packet switching device and stored in the reordering storage is outside a range or value, packets being communicated via the particular packet switching device to the reordering node are rate limited.

20 Claims, 6 Drawing Sheets

US 10,367,751 B2

DISTRIBUTING AND RATE LIMITING PACKETS AMONG MULTIPLE PATHS IN A SINGLE STAGE SWITCHING TOPOLOGY TO A REORDERING NODE

TECHNICAL FIELD

The present disclosure relates generally to packet switching devices and other apparatus typically in a packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. In using such technology, it is typically advantageous to transport packets in a quick and efficient manner despite congestion in the network.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
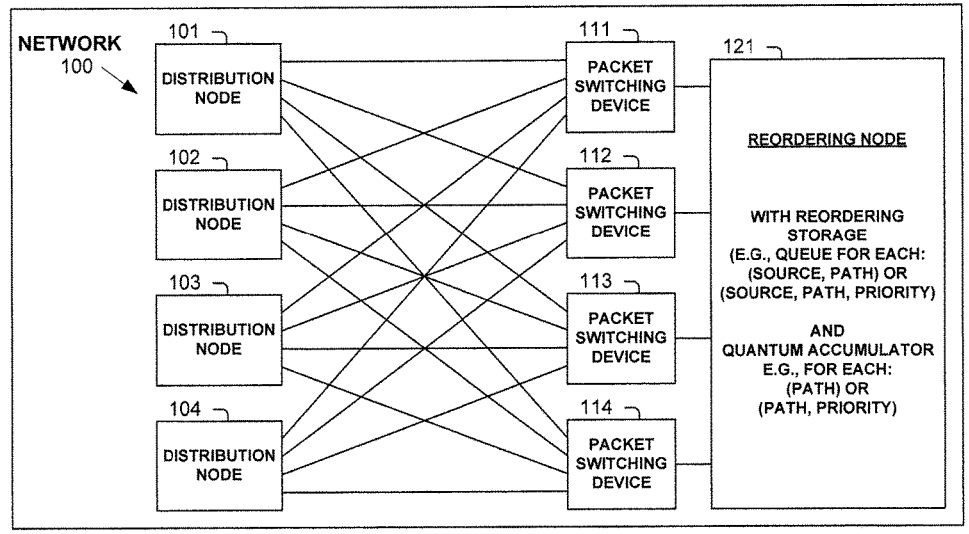
FIG. 1A illustrates a network operating according to one embodiment.

Disclosed are, inter alia, methods, apparatus, computer-storage media, mechanisms, and means associated with distributing and rate limiting packets among multiple paths in a single stage switching topology to a reordering node.

In one embodiment, each particular distribution node of multiple distribution nodes sends packets of different ordered sets of packets among multiple packet switching devices arranged in a single stage topology to reach a reordering node. The reordering node receives these packets sent over the different paths and stores them in reordering storage in the reordering node, such as, but not limited to in queues for each distribution node and packet switching device combination. The reordering node sends packets stored in the reordering storage from the reordering node in original orderings. Also, in response to determining that an aggregation quantum of packets received from the multiple distribution nodes via a particular packet switching device and stored in the reordering storage is outside a range or value (e.g., equals or exceeds a threshold value), rate limiting packets being communicated via the particular packet switching device to the reordering node, with the aggregation quantum including quantum of at least one packet received from each of the multiple distribution nodes.

In one embodiment, the rate limiting packets includes communicating to the particular packet switching device a Priority-based Flow Control (PFC) message requesting the rate limiting. In one embodiment, each of the plurality of packet switching devices are communicatively coupled to the reordering node via an Ethernet link. In one embodiment, each packet is associated with a priority of multiple priorities, and the rate limiting determination and operation is performed on a per priority basis. In one embodiment, the range or value is an absolute range or value, or a range or value relative to another aggregation quantum of packets or occupancy of all or a portion of the reordering storage.

2. Description

Disclosed are, inter alia, methods, apparatus, computer-storage media, mechanisms, and means associated with distributing and rate limiting packets among multiple paths in a single stage switching topology to a reordering node. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1A illustrate a network 100 operating according to one embodiment. Shown are four distribution nodes 101-104, each communicatively coupled via one or more links to each of packet switching devices 111-114. Each of packet switching devices 111-114 is communicatively coupled to reordering node 121 via one or more links, such as, but not limited to, via Ethernet links. In one embodiment, network 100 is an Ethernet fabric built using standard packet switching devices 111-114. As used herein, a link bundle comprising multiple individual links but appearing to the reordering node as a single link is considered a single link. Reordering node 121 includes reordering storage for storing packets received from each of distribution nodes.

Packet distribution (e.g., spraying across multiple paths packets of a packet ordering such as a stream or flow) and reordering and sending from a reordering node improves load balancing and increases the bandwidth level for a single flow above what a packet switching device can handle. One problem with reordering is that unequal congestion in the fabric can cause the reordering buffers to become quite large. Disclosed herein are disciplines for reducing the amount of reordering buffer necessary to reorder packets that are distributed across a switching fabric (e.g., across a single stage topology such as, but not limited to, that illustrated in network 100 of FIG. 1A and network 140 of FIG. 1B).

In one embodiment, reordering storage is organized to allow efficient reordering of the packets received from each of distribution nodes 101-104. In one embodiment, reordering storage includes a buffer for each distribution node 101-104. In one embodiment, these buffers include queues assigned to avoid head-of-line blocking.

In one embodiment, reordering storage (e.g., within these buffers) includes a queue for each combination of distribution node 101-104 and packet switching device 111-114. In one embodiment, reordering storage includes a queue for each combination of distribution node 101-104, packet switching device 111-114, and priority. As used herein, referring to a packet switching device 111-114 is the same as referring to link(s) between a packet switching device 111-114 and reordering node 121 when there is a single link or when no distinction is made for reordering purposes between an individual link of multiple links between a packet switching device 111-114 and reordering node 121.

In one embodiment, reordering storage includes a queue for each combination of distribution node 101-104 and each link between packet switching device 111-114 and reordering node 121. In one embodiment, reordering storage includes a queue for each combination of distribution node 101-104, each link between packet switching device 111-114 and reordering node 121, and priority. One embodiment rate limits on a per link basis. One embodiment does not rate limit on a per link basis, but rather on a per packet switching device basis despite multiple links between a packet switching device 111-114 and reordering node 121.

One embodiment keeps track of the current usage of the reordering memory, such as, but not limited to the amount of buffers occupied by packets received from each rate controllable source from a packet switching device 111-114 to reordering node 121 (e.g., per input link or port of reordering node 121). When the amount of used reordering storage equals or exceeds a certain absolute amount or amount relative to other quantum of packets from the same distribution node, that input link or port is receiving packets over a path experiencing very little queueing delay while other paths are experiencing significant queueing delay. In response, reordering node 121 requests the corresponding packet switching device 111-114 to rate limit packets being sent over the path(s) experience little queueing delay (as these packets are stored in reordering node 121 until packets in the original ordering are received over the other paths experiencing a higher queueing delay). In one embodiment, a request is made to rate limit by one quarter or one half, and possibly for a certain duration or until a request is made to no longer rate limit or to change the rate limiting amount. One embodiment does not rate limit to zero to avoid a dead lock or blocking condition of at least some of the ordered streams of packets. In one embodiment, Priority-based Flow Control (PFC) is used to communicate this rate-limiting request so that the backlog is temporarily stored in the packet switching device 111-114 upstream rather than in the reordering storage of reordering node 121. One embodiment is used in a single stage fabric where queueing delays in the single stage upstream are relatively certain.

In one embodiment, reordering node 121 maintains a packet quantum (e.g., count, size, occupancy amount of queues) in one or more accumulators of the reordering storage currently used to store packets received from each of packet switching devices 111-114 despite these packets being stored in different buffers/queues and coming from different distribution nodes.

In one embodiment, reordering node 121 maintains a packet quantum (e.g., count, size, occupancy amount of queues) in accumulators of the reordering storage currently used to store packets (despite these packets being stored in different buffers/queues and coming from different distribution nodes) received from: each of packet switching devices 111-114, each of packet switching devices 111-114 on a per priority basis, each of the links between packet switching devices 111-114 and reordering node 121, each of the links between packet switching devices 111-114 and reordering node 121 on a per priority basis, and/or other characterization(s) of the source(s) causing current high occupancy of the reordering storage such that this source(s) may be rate limited to alleviate or eliminate buffer overflow. The disciplines described herein can also be used to reduce the size of the reordering storage required as the rate limiting effectively uses storage in packet switching devices 111-114 to buffer packets to be sent to reordering node 121 rather than using reordering storage within reordering node 121.

Figure 1B:
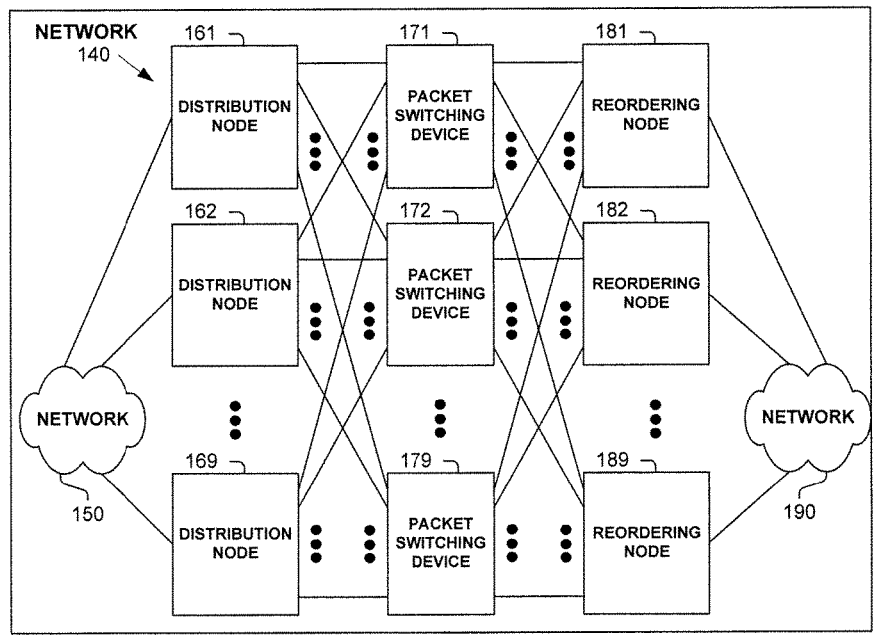
FIG. 1B illustrates a network operating according to one embodiment.

FIG. 1B illustrates one embodiment of a network 140, which includes a single stage fabric (e.g., Ethernet fabric) and operates according to the disciplines described in relation to FIG. 1A. As shown, each of multiple distribution nodes 161-169 are connected via one or more links to each of packet switching devices 171-179, and each of packet switching devices 171-179 are connected via one or more links to each of reordering nodes 181-189. Network 150 communicates ordered streams of packets to distribution nodes 161-169, which distribute packets of these ordered streams among packet switching devices 171-179, which then communicate these packets to the appropriate reordering node 181-189 (e.g., based on a destination address or packet classification operation such that all packets of an ordered stream are communicated to the same reordering node 181-189). Each of reordering nodes 181-189 request rate limiting as described herein. Each of reordering nodes 181-189 sends packets stored in their respective reordering storage in original orderings of these packet streams from the reordering node 181-189 to network 190.

Figure 2A:
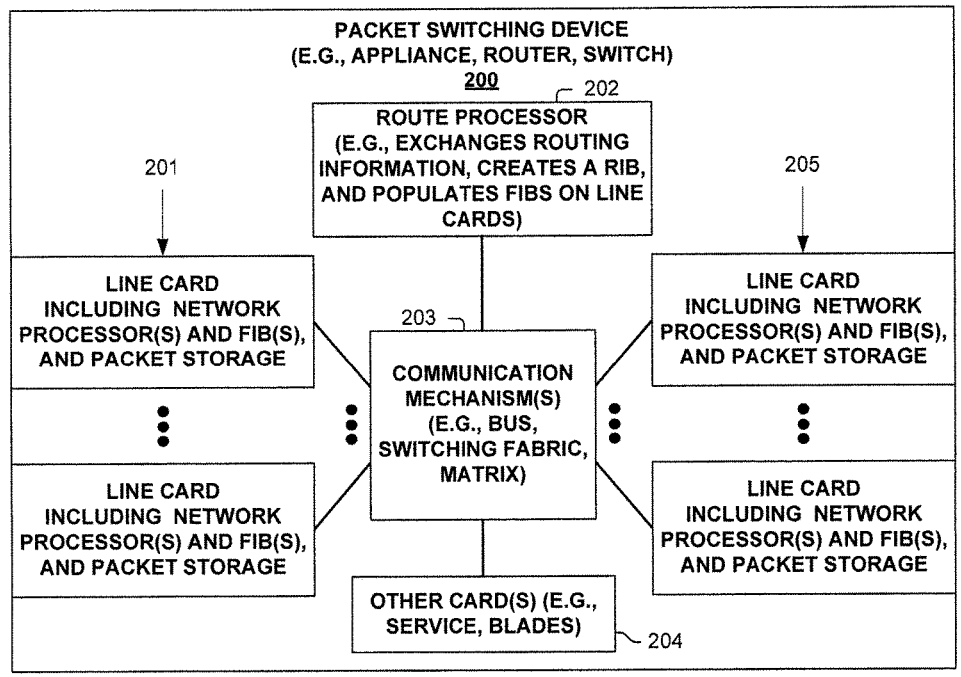
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), packet storage (e.g., buffers, queues, reordering storage) and with one or more processing elements that are used in one embodiment associated with distributing and rate limiting packets among multiple paths in a single stage switching topology to a reordering node. Packet switching device 200 also has a control plane with one or more processing elements 202 for managing the control plane and/or control plane processing of packets associated with distributing and rate limiting packets among multiple paths in a single stage switching topology to a reordering node. Packet switching device 200 also includes other cards 204 (e.g., service cards, blades) which include processing elements that are used in one embodiment to process packets associated with distributing and rate limiting packets among multiple paths in a single stage switching topology to a reordering node, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 perform forwarding lookup operations on forwarding information bases (FIBs) to determine how to ingress and/or egress process packets. Even though the term FIB includes the word "forwarding," this information base typically includes other information describing how to process corresponding packets.

Figure 2B:
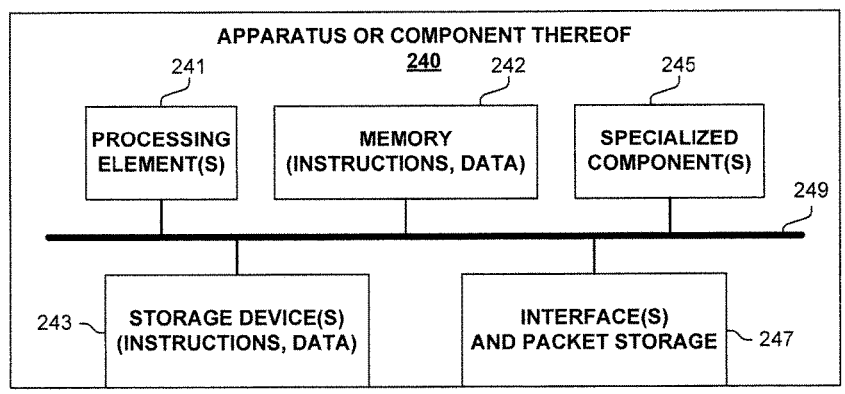
FIG. 2B illustrates an apparatus according to one embodiment.

FIG. 2B is a block diagram of an apparatus 240 used in one embodiment associated with distributing and rate limiting packets among multiple paths in a single stage switching topology to a reordering node. In one embodiment, apparatus 240 performs one or more processes, or portions thereof, corresponding to one of the flow diagrams illustrated or otherwise described herein, and/or illustrated in another diagram or otherwise described herein.

In one embodiment, apparatus 240 includes one or more processor(s) 241 (typically with on-chip memory), memory 242, storage device(s) 243, specialized component(s) 245 (e.g. optimized hardware such as for performing lookup and/or packet processing operations, etc.), and interface(s) 247 for communicating information (e.g., sending and receiving packets, user-interfaces, displaying information, etc.) as well as packet storage (e.g., buffers, queues, reordering storage), which are typically communicatively coupled via one or more communications mechanisms 249 (e.g., bus, links, switching fabric, matrix), with the communications paths typically tailored to meet the needs of a particular application.

Various embodiments of apparatus 240 may include more or fewer elements. The operation of apparatus 240 is typically controlled by processor(s) 241 using memory 242 and storage device(s) 243 to perform one or more tasks or processes. Memory 242 is one type of computer-readable/computer-storage medium, and typically comprises random access memory (RAM), read only memory (ROM), flash memory, integrated circuits, and/or other memory components. Memory 242 typically stores computer-executable instructions to be executed by processor(s) 241 and/or data which is manipulated by processor(s) 241 for implementing functionality in accordance with an embodiment. Storage device(s) 243 are another type of computer-readable medium, and typically comprise solid state storage media, disk drives, diskettes, networked services, tape drives, and other storage devices. Storage device(s) 243 typically store computer-executable instructions to be executed by processor(s) 241 and/or data which is manipulated by processor(s) 241 for implementing functionality in accordance with an embodiment.

Figure 3:
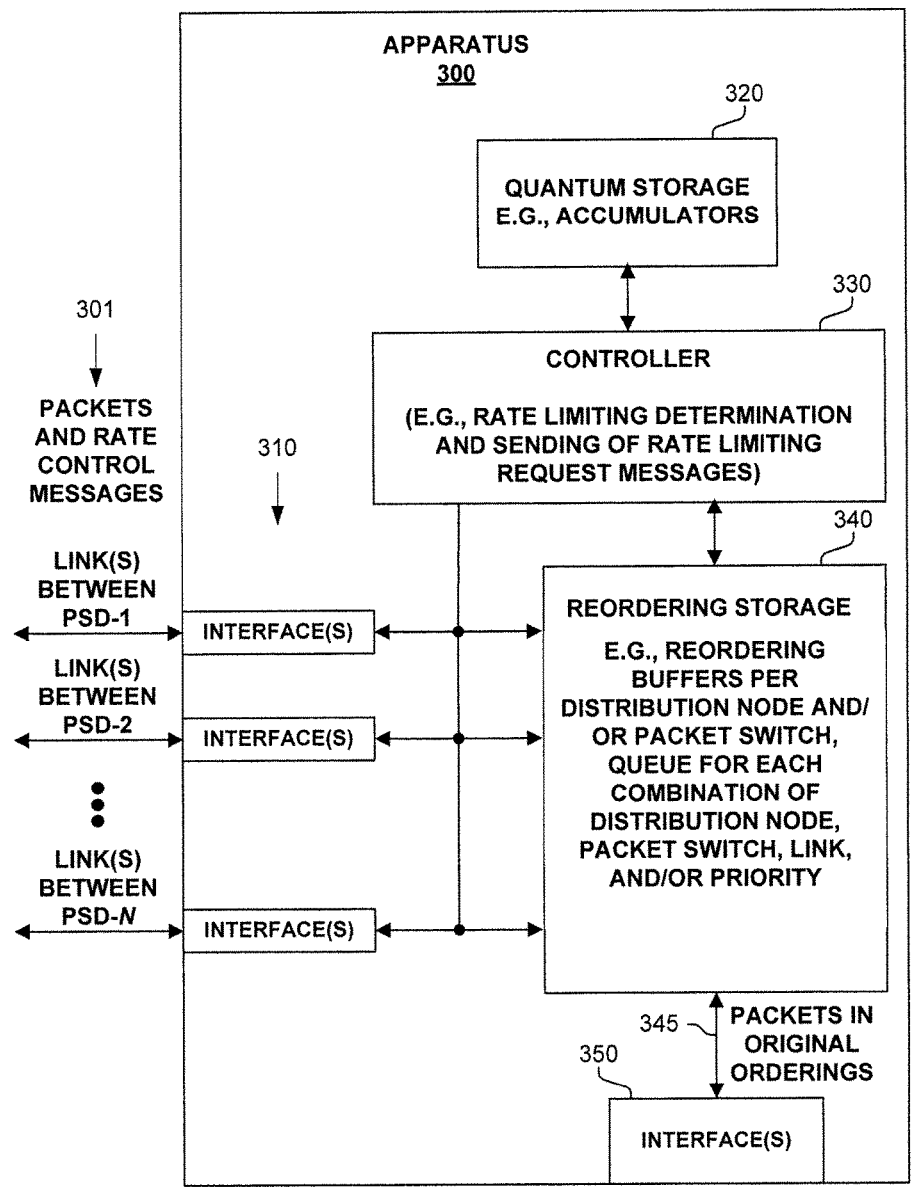
FIG. 3 illustrates an apparatus according to one embodiment.

FIG. 3 illustrates an apparatus 300, typically used within or in conjunction with a reordering node according to one embodiment. As shown, apparatus 300 includes interfaces 310 for sending and receiving packets to and from packet switching devices over links 301. Received packets to be reordered are stored in reordering storage 340. In one embodiment, reordering storage 340 is organized into multiple queues, one for each combination of distribution node and path; each combination of distribution node, path and priority; or another organization (e.g., as described herein). As used herein, path refers to a packet switching device, link, or other segmentation especially those for efficient packet reordering without blocking. Packets (345) in their original orderings are removed from reordering storage 340 and sent out interface(s) 350. As used herein, original orderings refer to the orders of streams or flows of packets as originally sent from distribution nodes, with the packets of a stream or flow of packets distributed from a single distribution node being sent out in this original order, typically without regard to an order of packets distributed from a different distribution node.

In one embodiment, controller 330 maintains quantum storage 320, such as having an accumulator 320 for each path, combination of path and priority, or some other combination corresponding to one that apparatus 300 may request rate limiting. The packet quantum (e.g., count, size, occupancy amount of queues) reflects the current packets stored in reorder storage (e.g., adjusted both when a corresponding packet is received by and sent from apparatus 300).

When a packet quantum becomes outside a range or value (e.g., equals or exceeds a threshold value) typically as determined by controller 330 (or other logic), controller 330 creates and causes a rate limiting message to be sent from the corresponding interface 310 over one or more links 301 to the corresponding packet switching device to decrease the rate of packets being sent to apparatus 330, typically for a short duration and thus self-expiring. In one embodiment, when a packet quantum changes from outside to inside a range or value (e.g., equals or is below a threshold value) typically as determined by controller 330 (or other logic), controller 330 creates and causes a cancellation of a previously sent rate limiting message (301) to be sent from the corresponding interface 310 to the corresponding packet switching device to increase the rate of packets being sent to apparatus 330. In one embodiment, the messages sent are Priority-based Flow Control (PFC) messages.

Figure 4:
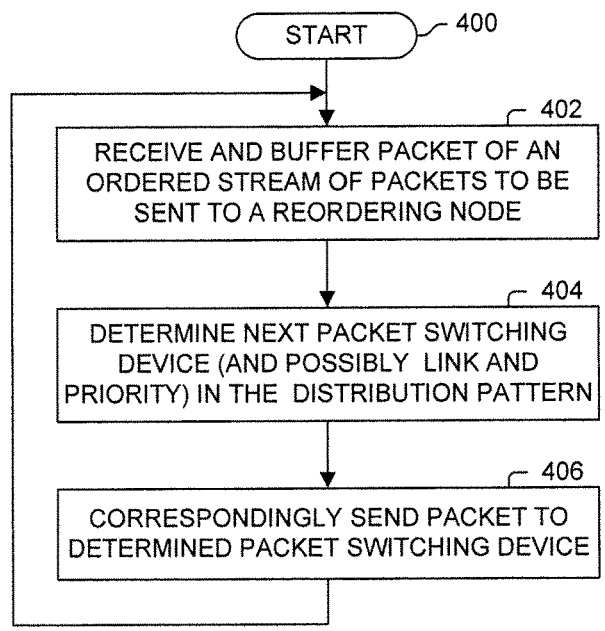
FIG. 4 illustrates a process according to one embodiment.

FIG. 4 illustrates a process performed by a distribution node according to one embodiment. Processing begins with process block 400. In process block 402, a packet of an ordered stream of packets (e.g., a packet flow) is received by the distribution node, with the packet stream being sent to a reordering node through a single stage topology fabric. In process block 404, the next packet switching device in the fabric (and possibly also a link and priority) in the distribution pattern is determined. In process block 406, the packet is correspondingly sent into the fabric towards the reordering node. Processing returns to process block 402.

Figure 5A:
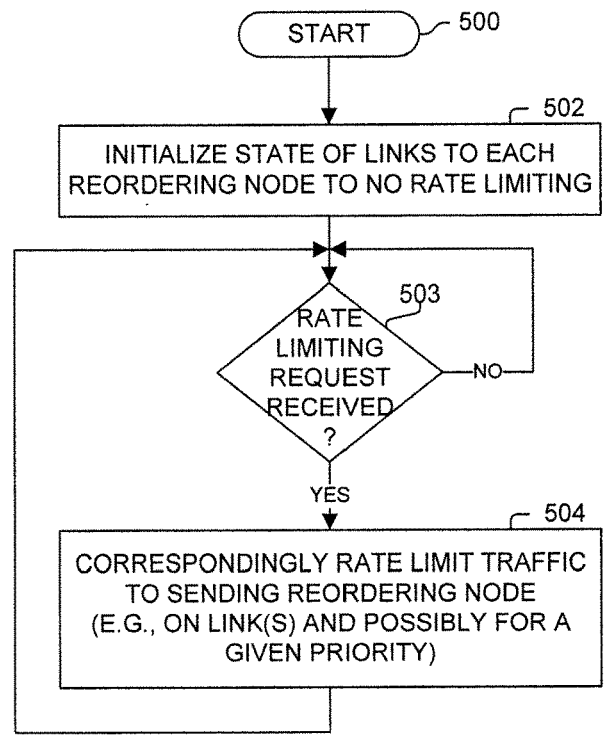
FIG. 5A illustrates a process according to one embodiment.

FIG. 5A illustrates a process performed by a packet switching device in a single stage switching fabric according to one embodiment. Processing begins with process block 500. In process block 502, the state of each link to the reordering node is set to a no rate-limiting. As determined in process block 503, in response to not receiving a rate limiting request message processing remains at process block 503. As determined in process block 503, in response to receiving a rate limiting request message (e.g., PFC message), in process block 504, the corresponding rate limiting state is set to rate limit traffic sent to the reordering node, possibly overall or on a particular link, and possibly with or without regard to a particular priority level associated with packets to be sent to the reordering node. In one embodiment, the rate limiting message could be a request to stop or change the current rate limiting, in which case the corresponding state is updated accordingly. Processing returns to process block 503.

Figure 5B:
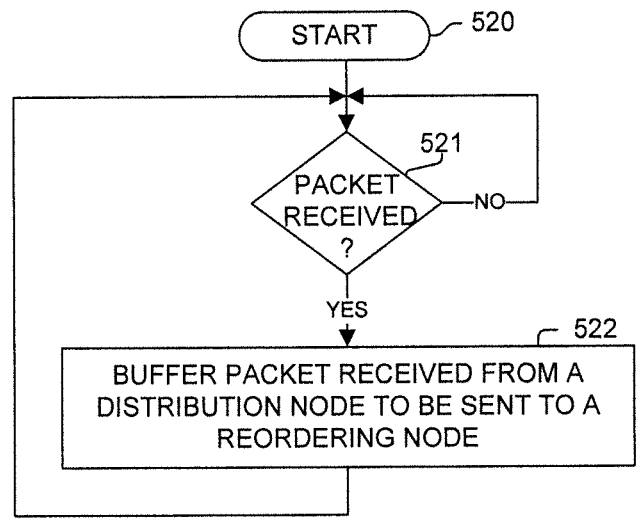
FIG. 5B illustrates a process according to one embodiment.

FIG. 5B illustrates a process performed by a packet switching device in a single stage switching fabric according to one embodiment. Processing begins with process block 520. As determined in process block 521, in response to not receiving a packet processing remains at process block 521. As determined in process block 521, in response to receiving a packet, in process block 522, the packet received from a distribution node is buffered before sending to the reordering node. Processing returns to process block 521.

Figure 5C:
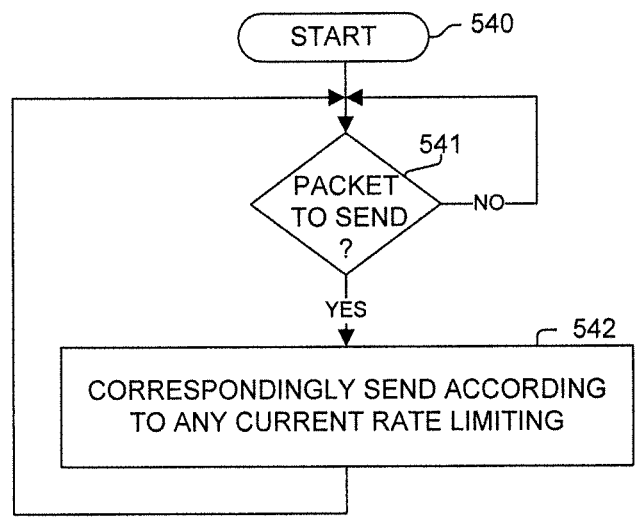
FIG. 5C illustrates a process according to one embodiment.

FIG. 5C illustrates a process performed by a packet switching device in a single stage switching fabric according to one embodiment. Processing begins with process block 540. As determined in process block 541, in response to not having a packet to send to the reordering node (e.g., because of no buffered packet or due to rate limiting) processing remains at process block 541. As determined in process block 541, in response to having a packet to send to the reordering node, in process block 542, the packet is sent to the reordering node (e.g., according to any current rate limiting for the path that the packet is traversing between the distribution node to the reordering node). Processing returns to process block 541.

Figure 6A:
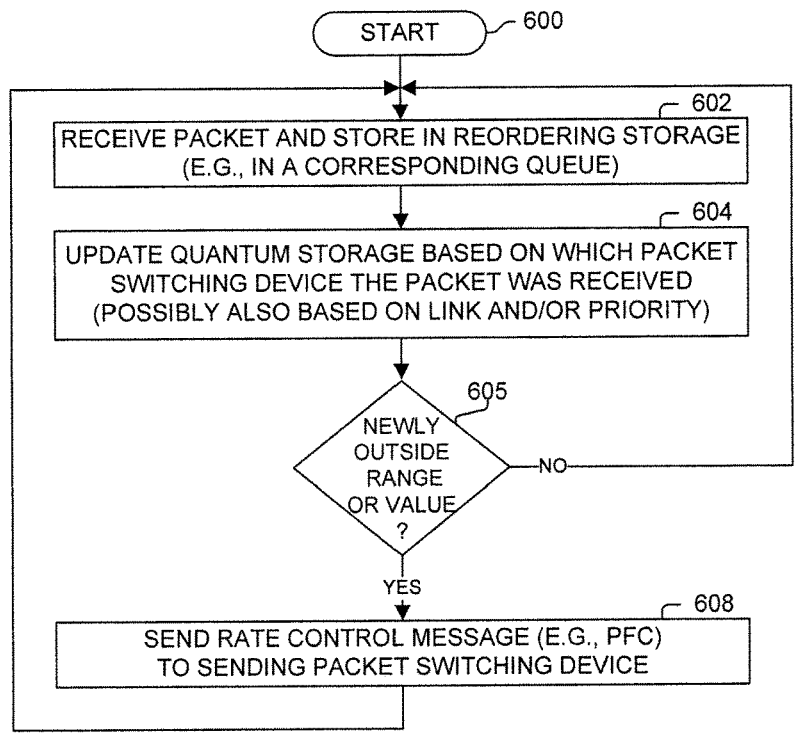
FIG. 6A illustrates a process according to one embodiment.

FIG. 6A illustrates a process performed by a reordering node according to one embodiment. Processing begins with process block 600. In process block 602, a packet is received and stored in reordering storage (e.g., in a corresponding queue). In process block 604, the quantum storage is updated based on the received packet (e.g., update the aggregation quantum accumulator associated with the packet switching device from which the packet was received, and possibly based on which link and/or a priority associated with the packet). As determined in process block 605, if the updated aggregation quantum is newly outside a range or value (e.g., equals or exceeds a threshold value), then processing proceeds to process block 608, else processing returns directly to process block 602. In process block 608, a rate control message (e.g., PFC message) is sent to the packet switching device that sent the packet to the reordering node, and processing returns to process block 602.

Figure 6B:
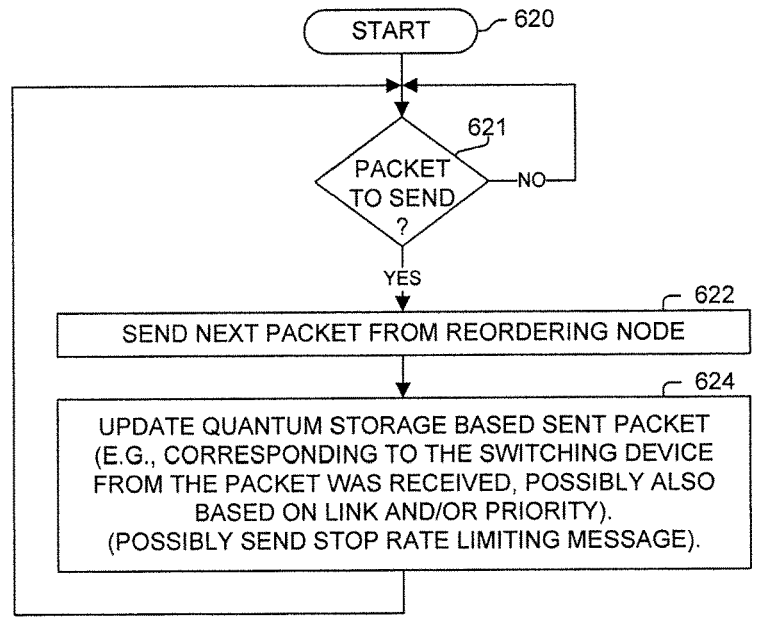
FIG. 6B illustrates a process according to one embodiment.

FIG. 6B illustrates a process performed by a reordering node according to one embodiment. Processing begins with process block 620. As determined in process block 621, if there is a packet to send from the reordering node which would be consistent with an original ordering of the packet as it was sent from the distribution node then processing proceeds to process block 622, else processing remains at process block 621. In process block 622, this next packet is sent from the reordering node. In process block 624, the quantum storage is updated based on the sent packet (e.g., update the aggregation quantum accumulator associated with the packet switching device from which the packet was received, and possibly based on which link and/or a priority associated with the packet). In one embodiment, if the updated aggregation quantum is newly inside a range or value (e.g., equals or below a threshold value), then a stop rate control message (e.g., PFC message) is sent to the packet switching device that sent the packet to the reordering node. Processing returns to process block 621

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   each particular distribution node of a plurality of distribution nodes distributing a different plurality of ordered packets among a plurality of packet switching devices arranged in a single stage topology to reach a reordering node, with each of the plurality of packet switching devices defining a different path between said particular distribution node and the reordering node;

the reordering node receiving said packets distributed by the plurality of distribution nodes and storing said packets in reordering storage in the reordering node;

in response to determining that an aggregation quantum of packets received from the plurality of distribution nodes via a particular packet switching device of the plurality of packet switching devices stored in said reordering storage is outside a range or value, rate limiting packets being communicated via the particular packet switching device to the reordering node, with the aggregation quantum including quantum of at least one packet received from each of the plurality of distribution nodes; and the reordering node sending packets stored in said reordering storage from the reordering node in original orderings.

2. The method of claim 1, wherein said reordering storage includes a plurality of reorder buffers, with each of the plurality of reorder buffers corresponding to a different one of the plurality of distribution nodes.

3. The method of claim 1, wherein said reordering storage includes a plurality of reorder buffers, with each of the plurality of reorder buffers corresponding to a different one of the plurality of packet switching devices.

4. The method of claim 1, wherein said reordering storage includes a different queue for each combination of each of the plurality of packet switching devices and each of the plurality of distribution nodes; and wherein said storing said packets in reordering storage includes correspondingly storing said packets in said queues.

5. The method of claim 4, wherein the reordering node maintains for each specific packet switching device of the plurality of packet switching devices an aggregation quantum corresponding to packets received from each of the plurality of distribution nodes via the specific packet switching device and currently stored in said queues.

6. The method of claim 1, wherein the reordering node maintains for each specific packet switching device of the plurality of packet switching devices an aggregation quantum corresponding to packets received from each of the plurality of distribution nodes via the specific packet switching device and currently stored in said reordering storage.

7. The method of claim 6, wherein the aggregation quantum corresponds to an aggregated size of said packets received from each of the plurality of distribution nodes via the specific packet switching device and currently stored in said reordering storage.

8. The method of claim 1, wherein each of the plurality of packet switching devices is said communicatively coupled to the reordering node via an Ethernet link; and wherein said rate limiting packets being communicated via the particular packet switching device to the reordering node includes communicating to the particular packet switching device a Priority-based Flow Control message requesting said rate limiting.

9. The method of claim 1, wherein each packet of the different plurality of ordered packets are associated with a priority of a plurality of priorities; and wherein said rate limiting determination and operation is performed on a per priority of the plurality of priority basis including in response to determining that an aggregation quantum of packets of a particular priority of the plurality of priorities received from the plurality of distribution nodes via the particular packet switching device stored said reorder storage outside said range or value, rate limiting packets of the particular priority being communicated via the particular packet switching device to the reordering node.

10. The method of claim 1, wherein the said range or value is an absolute range or value, or range or value relative to another aggregation quantum of packets.

11. A method, comprising:

each particular distribution node of a plurality of distribution nodes distributing one or more different plurality of ordered packets through each of a plurality of packet switching devices arranged in a single stage topology to a reordering node, with each of the plurality of packet switching devices having one or more different links to the reordering node, and with each packet of said one or more different plurality of ordered packets associated with a priority of one or more priorities;

the reordering node receiving said packets distributed by the plurality of distribution nodes and storing said packets in reordering storage in the reordering node;

in response to determining that an aggregation quantum of packets of a particular priority of said one or more priorities received from the plurality of distribution nodes from a particular packet switching device of the plurality of packet switching devices stored in said reordering storage is outside a range or value, rate limiting only packets of the particular priority being communicated through the particular packet switching device to the reordering node, with the aggregation quantum including quantum of at least one packet received from each of the plurality of distribution nodes; and the reordering node sending packets stored in said reordering storage from the reordering node.

12. The method of claim 11, wherein said one or more priorities includes at least two priorities.

13. The method of claim 12, wherein said reordering storage includes a different queue for each combination of each of said at least two priorities and each of the plurality of packet switching devices; and wherein said storing said packets in reordering storage includes correspondingly storing said packets in said queues.

14. The method of claim 13, wherein the reordering node maintains for each of said combinations an aggregation quantum corresponding to packets currently stored in said queues.

15. The method of claim 11, wherein said one or more different links includes at least two links.

16. The method of claim 15, wherein said rate limiting determination and operation is performed on a per link basis of each of said at least two links between each of the plurality of packet switching devices and the reordering node, including in response to determining that an aggregation quantum of packets of a particular priority of said one or more priorities received from the plurality of distribution nodes on a particular link of said different links from a particular packet switching device of the plurality of packet switching devices stored in said reordering storage is outside a range or value, rate limiting only packets of the particular priority being communicated through the particular packet switching device and over the particular link to the reordering node.

17. The method of claim 11, wherein the aggregation quantum corresponds to an aggregated size of said packets currently stored in said reordering storage.

18. The method of claim 11, wherein said rate limiting packets includes communicating to the particular packet switching device a Priority-based Flow Control message requesting said rate limiting of packet with the particular priority.

19. A network, comprising:
a plurality of distribution nodes;
a plurality of packet switching devices, with each of the plurality of packet switching devices communicatively coupling each of the plurality of distribution nodes to the reordering node in a single stage topology;
a reordering node including reordering storage comprising a queue for each combination of a particular distribution node of the plurality of distribution nodes and a particular packet switching device of the plurality of packet switching devices; and
a different quantum accumulator for each of the plurality of packet switching devices;
wherein each of the plurality of distribution nodes distributes a different ordered plurality of packets through each of the plurality of packet switching devices to the reordering node;
wherein the reordering node receives said packets distributed by the plurality of distribution nodes and correspondingly stores said packets in said queues, sends packets stored in said queues from the reordering node in original orderings, and maintains said different quantum accumulators in response to said receiving of packets and said sending of packets to reflect a current quantum of packets received from the plurality of packet switching devices and currently stored in said queues;
in response to a particular quantum accumulator of said quantum accumulators is outside a range or value for the particular quantum accumulator, the reordering node sending a rate limiting message to a particular packet switching device of the plurality of packet switching devices, with the particular packet switching device corresponding to the particular quantum accumulator; and
in response to receiving the rate limiting message, the particular packet switching device rate limiting packets being sent to the reordering node.

20. The method of claim 19, wherein the rate limiting message is a Priority-based Flow Control message requesting said rate limiting; and wherein each of the plurality of packet switching devices is said communicatively coupled to the reordering node via an Ethernet link.

* * * * *